(12) United States Patent
Guarro Agustí

(10) Patent No.: US 10,488,013 B2
(45) Date of Patent: Nov. 26, 2019

(54) LAMP SHADE, ASSEMBLY COMPRISING A SHADE AND A SHADE-SUPPORTING STRUCTURE, LAMP, AND METHOD FOR PRODUCTION OF A LAMP SHADE

(71) Applicant: GPC LAMPSHEID, S.L., Santa Maria de Palautordera (Barcelona) (ES)

(72) Inventor: Raimundo Guarro Agustí, Vallromanes (ES)

(73) Assignee: GPC LAMPSHEID, S.L., Santa Maria de Palautordera (ES)

( * ) Notice: Subject to any disclaimer, the term of this patent is extended or adjusted under 35 U.S.C. 154(b) by 82 days.

(21) Appl. No.: 15/546,141

(22) PCT Filed: Dec. 2, 2015

(86) PCT No.: PCT/ES2015/070872
§ 371 (c)(1),
(2) Date: Jul. 25, 2017

(87) PCT Pub. No.: WO2016/120507
PCT Pub. Date: Aug. 4, 2016

(65) Prior Publication Data
US 2018/0340670 A1 Nov. 29, 2018

(30) Foreign Application Priority Data
Jan. 26, 2015 (ES) .................... 201530094

(51) Int. Cl.
*B32B 3/28* (2006.01)
*F21V 1/06* (2006.01)
(Continued)

(52) U.S. Cl.
CPC .................. *F21V 1/22* (2013.01); *B32B 1/08* (2013.01); *B32B 3/00* (2013.01); *B32B 3/28* (2013.01);
(Continued)

(58) Field of Classification Search
CPC ..... F21V 1/00; F21V 1/22; F21V 1/26; F21V 1/06; B32B 3/28; B32B 7/05
See application file for complete search history.

(56) References Cited

U.S. PATENT DOCUMENTS 2,132,850 A * 10/1938 Huflage .................... F21V 1/00
362/348
2,224,950 A 12/1940 Burke
(Continued)

FOREIGN PATENT DOCUMENTS

DE 20 2012 102 564 U1 12/2013
FR 2 182 865 A2 12/1973
(Continued)

OTHER PUBLICATIONS

Spanish Search Report of ES Application No. 201530094 dated Dec. 21, 2015.
(Continued)

*Primary Examiner* — Karabi Guharay
(74) *Attorney, Agent, or Firm* — Sughrue Mion, PLLC

(57) ABSTRACT

The lamp shade is formed by a hollow enveloping body with laminar structure closed on itself. In an operative position it is assembled on a support structure and extends laterally around a light source, configuring an upper opening and a lower opening. The enveloping body comprises an exterior face and an interior face relatively rigid in the vertical direction and relatively flexible in the horizontal direction, the vertical direction being that which goes from the upper opening to the lower opening. The interior face comprises at least one corrugated surface portion vertically and at least one perimeter channel (6) perpendicular to the corrugations of the at least one portion for coupling the shade to the support structure.

17 Claims, 4 Drawing Sheets

(51) Int. Cl.

| | | |
|---|---|---|
| *F21V 1/22* | (2006.01) | |
| *F21V 1/14* | (2006.01) | |
| *F21V 1/26* | (2006.01) | |
| *B32B 3/00* | (2006.01) | |
| *B32B 7/12* | (2006.01) | |
| *B32B 9/02* | (2006.01) | |
| *B32B 9/04* | (2006.01) | |
| *B32B 9/06* | (2006.01) | |
| *B32B 21/06* | (2006.01) | |
| *B32B 21/08* | (2006.01) | |
| *B32B 27/08* | (2006.01) | |
| *B32B 27/10* | (2006.01) | |
| *B32B 27/30* | (2006.01) | |
| *B32B 27/32* | (2006.01) | |
| *B32B 27/36* | (2006.01) | |
| *B32B 29/00* | (2006.01) | |
| *B32B 1/08* | (2006.01) | |
| *B32B 7/05* | (2019.01) | |
| *B32B 38/10* | (2006.01) | |
| *B32B 38/00* | (2006.01) | |

(52) U.S. Cl.
CPC .................. *B32B 7/05* (2019.01); *B32B 7/12* (2013.01); *B32B 9/02* (2013.01); *B32B 9/045* (2013.01); *B32B 9/06* (2013.01); *B32B 21/06* (2013.01); *B32B 21/08* (2013.01); *B32B 27/08* (2013.01); *B32B 27/10* (2013.01); *B32B 27/304* (2013.01); *B32B 27/32* (2013.01); *B32B 27/36* (2013.01); *B32B 27/365* (2013.01); *B32B 29/00* (2013.01); *F21V 1/143* (2013.01); *F21V 1/26* (2013.01); *B32B 38/0004* (2013.01); *B32B 38/10* (2013.01); *B32B 2250/03* (2013.01); *B32B 2307/546* (2013.01); *B32B 2307/732* (2013.01)

(56) References Cited

U.S. PATENT DOCUMENTS

| | | | |
|---|---|---|---|
| 2,637,805 | A | 5/1953 | Jacobs |
| 2,979,606 | A * | 4/1961 | Koehler .................. F21V 1/00 362/291 |
| 2005/0117354 | A1 | 6/2005 | Hsu |
| 2008/0130297 | A1 | 6/2008 | Hui |

FOREIGN PATENT DOCUMENTS

| | | |
|---|---|---|
| FR | 2 396 646 A1 | 2/1979 |
| GB | 936 272 A | 9/1963 |
| GB | 2 342 433 A | 4/2000 |
| WO | 02/102592 A1 | 12/2002 |

OTHER PUBLICATIONS

International Search Report of PCT/ES2015/070872 dated Feb. 17, 2016 [PCT/ISA/210].

Written Opinion of PCT/ES2015/070872 dated Feb. 17, 2016 [PCT/ISA/237].

* cited by examiner

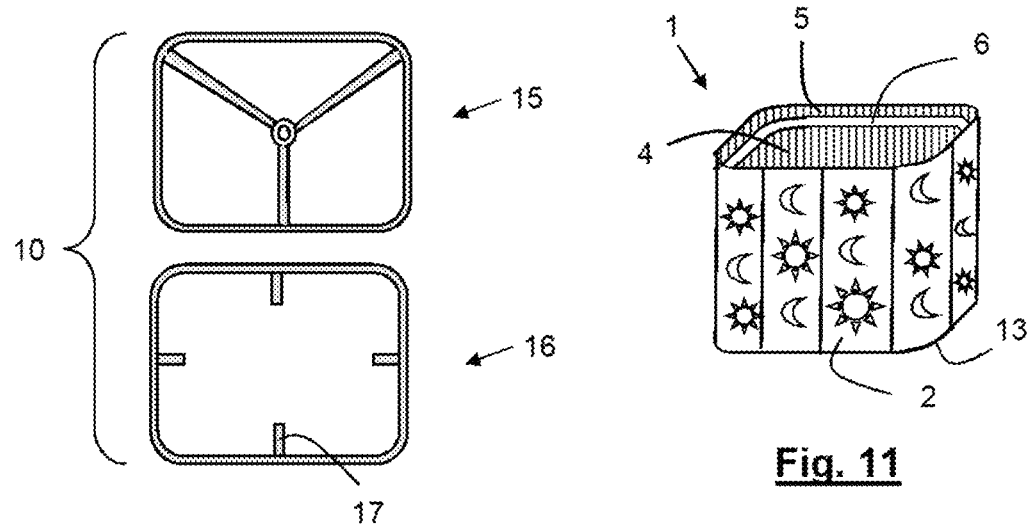
Fig. 10
Fig. 11
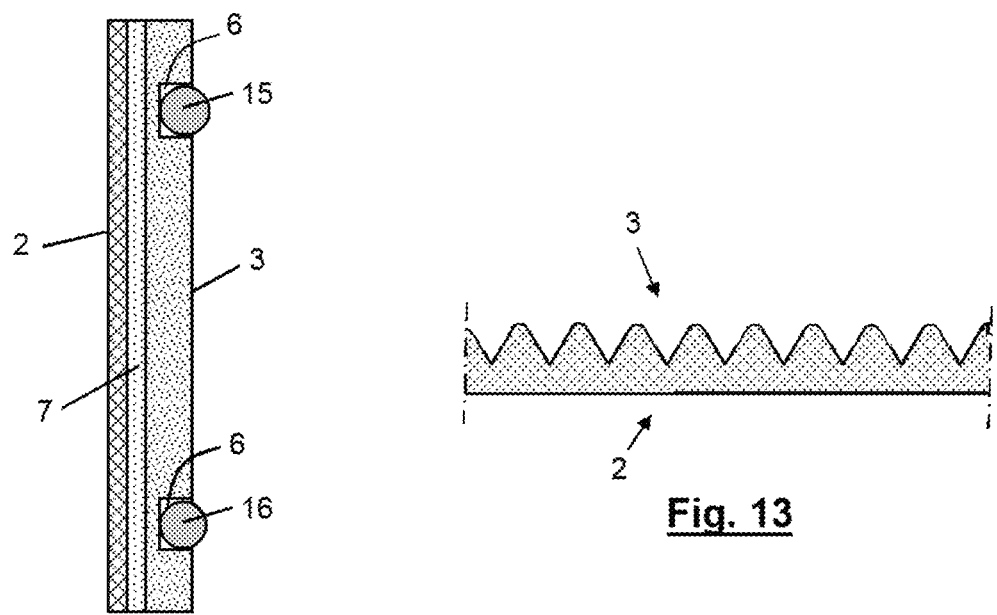
Fig. 12
Fig. 13

LAMP SHADE, ASSEMBLY COMPRISING A SHADE AND A SHADE-SUPPORTING STRUCTURE, LAMP, AND METHOD FOR PRODUCTION OF A LAMP SHADE

CROSS REFERENCE TO RELATED APPLICATIONS

This application is a National Stage of International Application No. PCT/ES2015/070872, filed Dec. 2, 2015, claiming priority based on Spanish Patent Application No. P201530094, filed Jan. 26, 2015, the contents of all of which are incorporated herein by reference in their entirety.

TECHNICAL SECTOR OF THE INVENTION

The present invention relates to a lamp shade formed by a hollow enveloping body with a laminar structure closed on itself. In an operative position, the shade is assembled on a shade support structure and extends laterally around a light source, the upper edge of the enveloping body configuring an upper opening and the lower edge configuring a lower opening. The enveloping body comprises an exterior face and an interior face intended to be orientated towards the light source in the operative position, the interior layer being relatively rigid in the vertical direction and relatively flexible in the horizontal direction, the vertical direction being determined as that which goes from the upper opening to the lower opening.

The invention also relates to an assembly of a shade and a support structure of the same, to a lamp which comprises said assembly and to a method for manufacturing the lamp shade.

BACKGROUND OF THE INVENTION

At present, the lamps having a cylindrical shade configuration with large diameter with respect to the height thereof enjoy widespread acceptance among the public in meeting centers, shopping centers, catering and other public spaces, where the aesthetic factor plays a role as significant as the efficiency of the lighting.

These types of lamps involve the shade being supported in general by a support structure arranged in the interior space of the cylinder which configures the shade, a structure formed by an upper ring, termed the tripod, provided with a lamp holder washer and a lower ring, arranged in parallel horizontal planes. In some of these lamps, the shades are formed by a plasticized material such as a plasticized fabric or a plasticized paper which joins the upper ring to the lower ring configuring a cylinder. These types of lamps must be sent already assembled, with the shade joined to the rings, which represents a considerable volume. In other cases, the cited rings are joined by vertical rods, together forming a rigid frame. Both the cylindrical shade of plasticized material as well as the rigid frame involve a very voluminous and bulky space at the time of storing and transporting the lamps with the shades and/or frames thereof, since they cannot be stacked, fitting them into each other to take advantage of the storage and shipping space, as is the case when there are various frames or shades for lamps with a truncated conic configuration which, generally, are transported in boxes which contain a certain number of shades fitted into each other.

There are solutions in which the frames are formed of articulated rods which adopt a folded position for the transport thereof, although these are complicated and costly to manufacture.

Another recent alternative consists of support structures composed of two independent metallic rings, with circular contour, to which the shade is joined by way of hooking means provided on the same. In these cases, the body of the shade can be folded when made of a suitable material or is rigid in one direction, particularly in the vertical direction and flexible in the horizontal direction such that the body of the shade can be folded in one direction, occupying less space, as is described in the patent documents US20050117354-A1 and US20080130297-A1 respectively. These solutions represent an improvement in terms of space saving, ease of transport thereof and the consequent saving of transport costs. However, these shade and support structure systems involve a laborious manufacturing process, since the hooking means have to be inserted, configured in the form of a hook between the layers which form the shade as is the case in the document US20080130297-A1, in addition to having to observe that, when the shade is folded, the hooks do not damage the interior surface of the other side of the shade which is opposed when it is folded. In the document US20050117354-A1, the hooking means are formed by strips which are provided on the rings and by other strips which are provided on the interior surface of the shade, adapted to be joined together, the section of the ring being surrounded by the strips joined to one and the other part. The process of joining strips to the shade and others to the ring as well as the process of hooking the rings to the shade is laborious since each pair of strips has to be hook one by one and ensuring that the rings are perfectly horizontal is time-consuming. Another drawback is that with the assembly and disassembly of the lamp, the strips can lose the mutual joining capacity thereof without being able to reliably ensure that the ring is secured the whole time required to have the lamp assembled, or even if by accident some person pulls the shade downwards, the strips could be unhooked.

Thus it is revealed the need to provide a shade, which occupies a reduced space during the storage and transport thereof, which can be transported in an individual box with reduced dimensions which is easy to assemble and disassemble and which ensures at all times the stability of the coupling between the shade and the support structure thereof.

DESCRIPTION OF THE INVENTION

With the aim of providing a solution to the drawbacks set out, a lamp shade is made known formed by a hollow enveloping body with a laminar structure closed on itself. In an operative position, the shade is assembled on a support structure and extends laterally around a light source, the upper edge of the enveloping body configuring an upper opening and the lower edge configuring a lower opening. The enveloping body comprises an exterior face and an interior face intended to be orientated towards the light source in the operative position, the interior face being relatively rigid in the vertical direction and relatively flexible in the horizontal direction, the vertical direction being determined as that which goes from the upper opening to the lower opening.

In essence, the shade is characterized in that the interior face comprises at least one corrugated surface portion according to the vertical direction and at least one perimeter channel which extends in the perpendicular direction or with a certain inclination with respect to the corrugations for coupling the shade to the shade support structure.

Corrugated surface is understood as a smooth surface with grooves or projections distributed in a regular manner.

In accordance with another characteristic of the invention, the interior face comprises at least two corrugated surface portions, formed by a main portion and by a secondary portion separated by a perimeter channel, the secondary portion being arranged between the perimeter channel and the upper edge or between the perimeter channel and the lower edge of the enveloping body.

In accordance with another characteristic of the invention, according to a preferred embodiment, the interior face comprises three corrugated surface portions, formed by a main portion and by two secondary portions, one upper and one lower, the upper secondary portion being arranged between the upper edge and a perimeter channel which separates it from the main portion and the lower secondary portion between the lower edge and another perimeter channel which separates it from the main portion.

According to another characteristic of the invention, according to the preferred embodiment, the height of the or each secondary portion measured in the vertical direction is less than the height of the main portion.

According to another variant of the invention, the interior face comprises a single corrugated surface portion according to the vertical direction and in which the at least one perimeter channel is formed by a notch or depression made on the corrugated surface portion (for example, by milling or carving a part of the corrugated surface).

According to another characteristic of the invention, according to the preferred embodiment, the corrugated surface is formed by a sheet with multiple folds in the vertical direction forming a succession of peaks and troughs.

According to another characteristic of the invention, also according to the preferred embodiment, the succession of peaks and troughs of the corrugated surface has a profile, the transversal section thereof, according to a cut perpendicular to the vertical direction, is in the form of a zigzag, undulated or with trapezoidal, rectangular or square waves, preferably with rounded edges.

Preferably, the thickness of the wall of the profile, measured in the direction perpendicular to the vertical direction, is between 0.02 mm and 0.5 mm. The thickness of the wall of the profile is equivalent to the thickness of the sheet from which the succession of peaks and troughs is formed by folding.

According to another characteristic of the invention, the corrugated surface preferably has a thickness of between 1.5 and 50 mm. The thickness of the corrugated surface is equivalent to the height of the peaks or to the depth of the troughs of the succession formed by multiple folds.

According to another characteristic of the invention, the corrugated surface, according to the preferred embodiment, is made of a plastic or plasticized material.

According to another characteristic of the invention, the at least one perimeter channel has a height, measured in the vertical direction of between 1 and 50 mm.

According to the preferred embodiment of the invention, the exterior face and the interior face belong to two layers different from those from which the enveloping body is formed, joined together by means of an intermediate layer with a laminar structure provided with an adhesive on the two faces thereof. The layer of the exterior face has a laminar structure and can be manufactured in a synthetic material or a material of animal or plant origin.

According to another embodiment, the enveloping body is not formed by the joining of two layers, but the laminar structure which, closed on itself, forms the enveloping body, is a molded structure, the interior face thereof comprises the at least one corrugated surface portion, configured by a succession of peaks and troughs and at least one perimeter channel, the exterior face being smooth and the space between the interior face and the exterior face being full of material. In this case, the enveloping body is preferably made of cardboard, paperboard, silicone or plastic.

According to a second aspect of the invention, a shade and support structure assembly is made known, in which the shade is as previously described, according to any one of the embodiments.

According to another characteristic of the shade and support structure assembly, the support structure comprises a lamp holder ring, the dimensions thereof are adapted for being housed with adjustment in at least one perimeter channel of the shade.

According to another characteristic of the assembly of the invention, the interior face of the shade comprises two perimeter channels and the support structure comprises a second ring, the dimensions thereof are adapted for being housed with adjustment in a corresponding perimeter channel of the interior face of the shade.

According to a third aspect of the invention, a lamp is also made known which comprises a shade and support structure assembly as the one previously described.

According to a fourth aspect of the invention, a method for manufacturing a lamp shade, such as the one previously described, is made known.

In essence, the manufacturing method, object of the invention, is characterized in that it comprises the steps of:

a) having a structure which comprises, on one of the faces thereof, at least one corrugated surface and at least one channel which extends in the perpendicular direction or with a certain inclination with respect to the corrugations, the structure being delimited by an upper edge and a lower edge, perpendicular to the direction in which the corrugations are arranged and two lateral edges, the cited face being relatively rigid according to the direction of the corrugations and relatively flexible according to the direction perpendicular to the corrugations; and b) joining the two lateral edges, opposing them or superimposing them, configuring a hollow enveloping body in which the upper edge of the enveloping body forms the upper opening of the shade and the lower edge forms the lower opening of the shade.

According to another characteristic of the method, object of the invention, the structure of step a) comprises two channels and three corrugated surface portions formed by a main portion and by two secondary upper and lower portions, such that the upper secondary portion is arranged between the upper edge and a channel which separates it from the main portion and the lower secondary portion is arranged between the lower edge and the other channel, which separates it from the main portion.

According to another characteristic of the method, object of the invention, according to a preferred manner of proceeding, the structure of step a) is the result of joining an exterior layer of laminar structure to an interior layer by way of the corresponding joining by adhesive of said layers to an intermediate layer of laminar structure in which the interior layer is that which, on the free face thereof (the face opposed to the joining by adhesive to the intermediate layer) comprises the corrugated surface portions and the two canals.

According to another characteristic of the invention, preferably each channel has been made, making two parallel cuts in the interior layer from one lateral edge to the other lateral edge following a perpendicular direction or with a certain inclination with respect to the corrugations, the cuts being separated from each other by a certain distance and the depth of the cuts being equal to the thickness of the interior layer completely passing through it and subsequently the part of the interior layer between the two cuts has been removed, separating it from a corresponding part of intermediate layer to which it was joined, the rest of the interior layer remaining joined to the intermediate layer.

In an alternative manner to the one previously described, each channel is made by milling or carving a part of the corrugated surface of the interior layer from one lateral edge to the other lateral edge following a perpendicular direction or with a certain inclination with respect to the corrugations, the depth of the milling or carving being equal to or less than the thickness of the interior layer completely or partially passing through it.

Independently of the fact that the channels have been made by cutting or by milling or carving, according to another characteristic of the method, the exterior layer can be joined to the intermediate layer before or after making the channels in the interior layer already joined to the intermediate layer.

BRIEF DESCRIPTION OF THE DRAWINGS

In the attached drawings, embodiments of the shade and of the shade and support structure assembly, object of the invention are illustrated by way of non-limiting example. Furthermore, some of the steps of the method for manufacturing the shade, object of the invention, are illustrated schematically. In said drawings:

FIG. 10 is a plan view of another embodiment of the shade support structure as part of the shade and structure assembly, object of the invention, in which unlike the assembly of FIG. 1, the rings have a perimeter in rectangular form instead of circular form;

FIG. 11 is a perspective view of another embodiment of the shade, object of the invention, adapted to be supported by the support structure of FIG. 10;

FIG. 12 is a sectional view similar to that of FIG. 5 belonging to another embodiment of the shade, object of the invention, in which each perimeter channel is formed by a notch formed by milling or carving in the corrugated surface of the interior face;

FIG. 13 is a sectional view similar to that of FIG. 5 belonging to another embodiment of the shade, object of the invention, in which the enveloping body is formed by a molded laminar structure closed on itself.

DETAILED DESCRIPTION OF THE DRAWINGS

Figure 1:
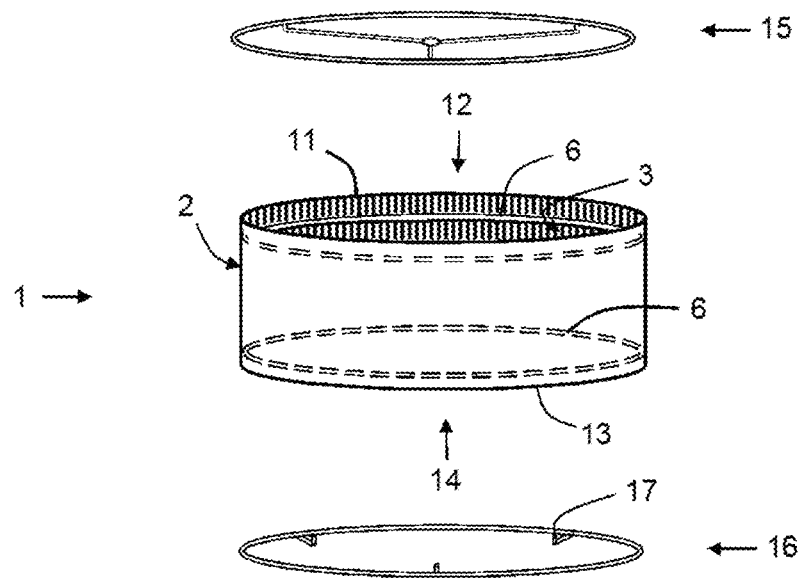
FIG. 1 is a perspective and exploded view of the shade and shade support structure assembly, object of the invention according to the preferred embodiment.

In FIG. 1, the exploded view of an assembly is shown formed by a shade 1 and a shade support structure 10, formed by a lamp holder ring 15 and by another ring 16 which in turn may or may not be provided, in addition to fastening means 17 adapted for the fastening of a closing cap (not shown in the drawings) of the interior opening 14 of the shade 1.

The shade 1 is formed by a hollow enveloping body with a laminar structure closed on itself, in a cylindrical form as shown in FIG. 1. The fact that the structure is described as laminar means that the length and height dimensions of the structure are far greater than the dimension of the thickness. In an operative position, the shade 1 is assembled on the support structure 10 and extends laterally around a light source such as a bulb (not shown in the drawing). The upper edge 11 of the enveloping body forms an upper opening 12 and the lower edge 13 forms a lower opening 14. The upper opening 12 is passed through by a cable which supports the shade 1 from the ceiling. Specifically the lamp holder ring 15 is that which is supported by the cable if it is a ceiling lamp or if it is a floor lamp, the lower opening 14 is passed through by the foot of the lamp which receives the support of the lamp holder ring 15.

The enveloping body of the shade 1 comprises an exterior face 2 visible from the exterior of the shade 1 and an interior face 3 intended to be orientated towards the light source in the operative position. Considering the vertical direction as the direction which goes from the upper opening 12 to the lower opening 14, the interior face 3 is a relatively rigid face in the vertical direction and relatively flexible in the horizontal direction. In the represented drawings, the exterior face 2 and the interior face 3 belong to two layers different from those from which the enveloping body is formed, said layers being joined together by an intermediate layer 7 provided with adhesive on the two faces thereof.

Figure 4:
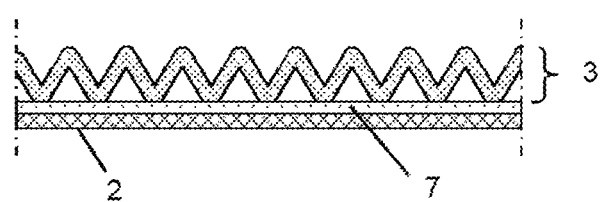
FIG. 4 is a sectional view of the shade of FIG. 1, particularly according to the A-A cut of FIG. 2.
Figure 7:
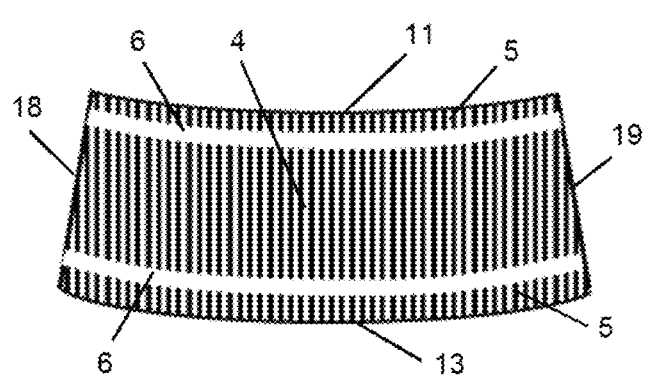
FIG. 7 is an elevation view of the interior face of a structure before being closed on itself to form the enveloping body of an embodiment of the shade with a truncated conic configuration, object of the invention, unlike the enveloping body with cylindrical configuration of FIG. 1.

The interior face 3 comprises corrugated surface portions according to the vertical direction, in which said surface is formed by a sheet, preferably plastic or paper or plasticized fabric, with multiple folds in the vertical direction forming a succession of the peaks and troughs as can be observed in FIGS. 4 and 7. Furthermore, the interior face 3 also preferably comprises two perimeter channels 6 which extend in the direction perpendicular to the corrugations and which are adapted for coupling the shade 1 to the rings 15 and 16 of the shade support structure 10 (see FIGS. 5 and 12).

The succession of peaks and troughs of the corrugated surface has a profile, the transversal section thereof, according to a cut perpendicular to the vertical direction, is in the form of a zigzag with rounded edges as shown in FIG. 4.

Figure 9:
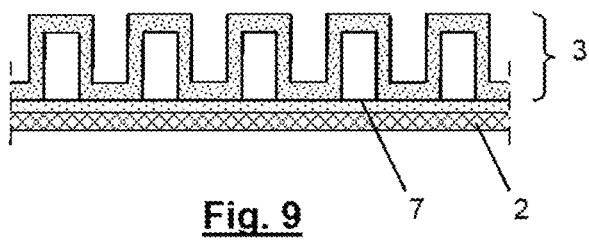
FIG. 9 is a sectional view like that of FIG. 4 with the difference that the corrugated surface structure of the interior face has folds with rectangular sections instead of in zigzag section with rounded edges of FIG. 4.

However, the profile of the succession of peaks and troughs can have other forms such as for example undulated (with curved waves) or with trapezoidal, rectangular (see FIG. 9) or square waves. It is preferable for the edges of the waves to be rounded.

The thickness of the sheet of the wall of the profile with peaks and troughs measured in the direction perpendicular to the vertical direction is generally between 0.02 mm and 0.5 mm, depending on the dimensions of the lamp.

The thickness of the corrugated surface of the interior face 3, that is to say, the distance with which each corrugation projects from the intermediate layer 7 is generally between 1.5 and 50 mm. The material from which the interior face 3 is manufactured is preferably PVC plastic or paper or fabric plasticized with PVC, although other plastic materials such as polypropylene, polyester, polycarbonate or other materials such as cardboard or paperboard are not excluded.

By way of example, the shade 1 of FIG. 1 is a cylindrical shade 1 with a diameter of 80 cm provided with an exterior face 2 of fabric of 0.1 mm thickness, joined by means of an intermediate layer 7 of a PVC sheet of 0.3 mm to a layer with thickness of 3 mm, the free surface thereof (interior face 3) has corrugations in the vertical direction, formed by folds with zigzag section from a paper sheet plasticized with PVC of 0.08 mm thickness.

The corrugated surface of the interior face 3 per se also constitutes a decorative component of the lamp, since it is visible in large part by the user when the cylindrical shade 1 has greater dimensions, as is the case in lamps located in large shopping centers, convention centers and hotel establishments.

The exterior face 2 can form part of the layer with laminar structure, preferably made in a synthetic material (preferably plastic) or material of animal or plant origin. Thus the layer which comprises the exterior layer 2 can be formed by a fine sheet of plastic, skin, wood, paper, cork or fabric. The layer of the exterior face 2 in any case is a layer devoid of rigidity so as not to interfere with the behavior of the exterior face 3 which constitutes the resistant nucleus of the shade 1, relatively rigid in the vertical direction and relatively flexible in the horizontal direction.

The layer which comprises the interior face 3 is joined to the layer which comprises the exterior face 2 by means of an intermediate layer 7 also with a laminar structure, preferably non-rigid plastic, being provided with adhesive between the layers to be joined (see FIGS. 4, 5, 9 and 12).

Figure 6:
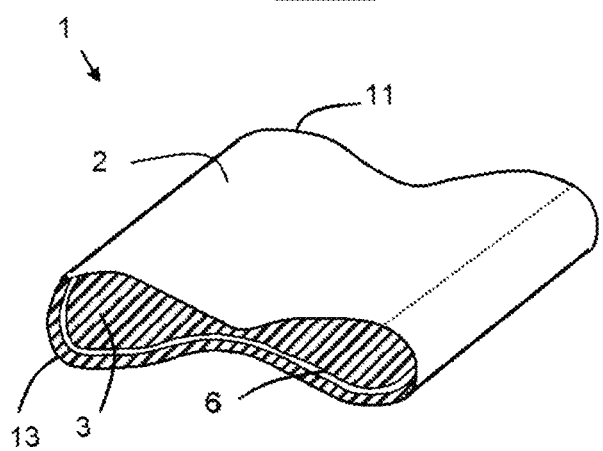
FIG. 6 is a perspective view of the shade of FIG. 1 in a non-operative position, specifically in a position suitable for the packaging or storage thereof.

The difference of flexibility of the interior face 3 in the vertical and horizontal direction causes the shade 1 to be horizontally foldable, that is to say, around vertical axes parallel to the corrugations and it can be stored and transported occupying a smaller space, as is represented in FIG. 6. In this way, the shade 1 can be folded many times around the axes which follow the direction of the corrugations and represent a comparatively much smaller volume with respect to that of other conventional shades, saving space and transport costs, as a shade 1 can be sent folded in the manner indicated in an individual box with reduced size.

Thus the drawbacks which existed with the existing cylindrical shades, which have to be transported already assembled and therefore occupy a very considerable volume increasing the transport costs, are overcome. The shade 1 described, as is explained further on, can also be in truncated conic form (see FIG. 8) and also allows the storage and sending of the shade 1 in a box with smaller dimensions, since it can be folded in the same manner indicated. The existing truncated conic shades were easier to transport than the cylindrical ones, since the truncated conic form allows them to be stacked, fitting into each other to a certain point, and thus they were usually stacked in groups of a certain maximum number of shades, for example fifteen, the manufacturer sending a box per group. However, the distributor receiving the box has to select from the group the shades to be sent to the final recipients and inevitably has to send boxes similarly voluminous although they only contain one or a few shades in the interior thereof. With the shades 1 described provided with the corrugated surface on the interior face thereof 3, these situations are now not a problem since if it is so desired, each folded shade can be sent in an independent box with reduced size and the distributor only has to write the address of the end customer in each case.

As has been mentioned at the beginning, the shade 1 which is shown in FIG. 1 is formed by a hollow enveloping body with laminar structure, formed by the joining of the three layers, closed on themselves, forming an open cylinder at the ends thereof. The laminar structure which is subsequently closed on itself, joining the two lateral edges 18 and 19 is that which is represented in FIGS. 2 and 3, viewed from the interior face 3 and from the exterior face 2, respectively.

Figure 2:
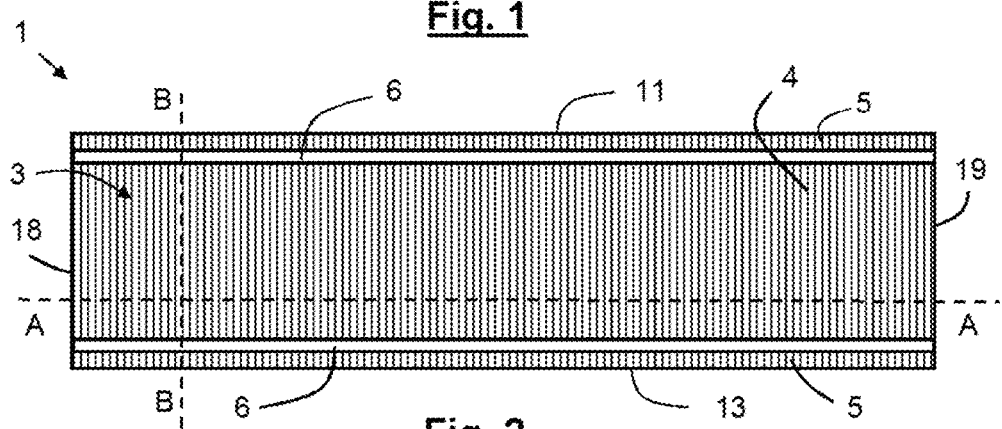
FIG. 2 is an elevation view of a flattened structure which forms the enveloping body of the shade of FIG. 1 when it is closed on itself, seen from the interior face.
Figure 3:
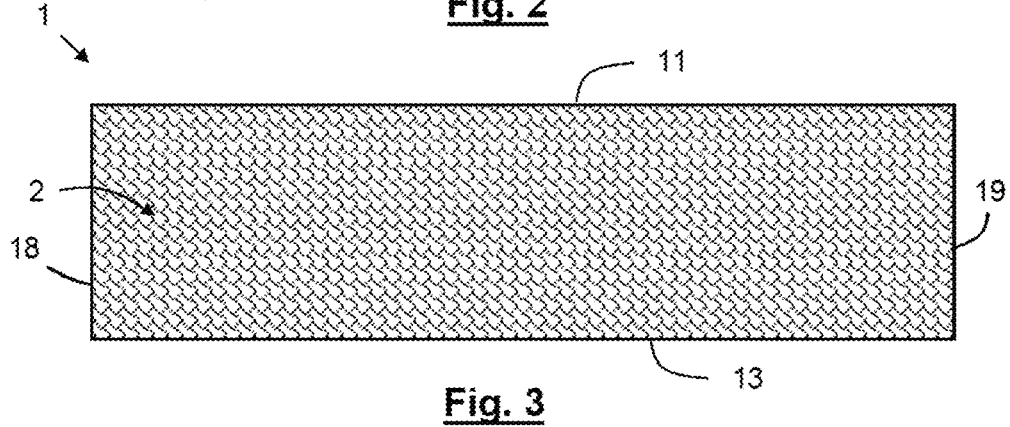
FIG. 3 is an elevation view of the flattened structure which forms the enveloping body of the shade of FIG. 1 when it is closed on itself, seen from the exterior face.

In FIG. 2, it is observed that the interior face 3 comprises a main portion 4 and two secondary portions 5, all of which with corrugated surface according to the vertical direction. The main portion 4 occupies a central position and is distanced from the secondary portions 5 by a respective separation space which forms a respective perimeter channel 6. As is observed, the upper perimeter channel 6 is situated at a short distance from the upper edge 11 of the enveloping body and the lower perimeter channel 6 is also situated at a short distance from the lower edge 13, consequently the main portion 4 has a greater height than the secondary portions 5. The proximity of the perimeter channels 6 to one of the upper 11 or lower 13 edges of the enveloping body facilitates the subsequent placement of the support structure 10, specifically of the two rings 15 and 16 in the corresponding perimeter channels 6, as is explained further on.

In relation to the dimensions of the perimeter channels 6, by way of example, the height of each perimeter channel 6 is between 1 and 50 mm since they must house the rings 15 and 16 of the support structure 10. For example, if the lamp holder ring 15 has a diameter of 90 cm and has a circular section of 3 mm, the perimeter channel 6 should have a height equal to or close to 3 mm to accommodate the lamp holder ring 15 with certain adjustment. In terms of the depth of the perimeter channel 6 measured horizontally, in the direction which goes from the interior face 3 to the exterior face 2 (radial direction when the shade 1 is in the operative position), it is not necessary for it to accommodate the entire section of the ring 15 or 16, that is to say, there is no reason for it to be equal to the diameter of the circular section of the ring 15, 16, but the ring 15, 16 can project with respect to the outermost surface of the exterior face 3, as is observed in FIGS. 5 and 12, the depth of the perimeter channel 6, for example being greater than the radius of the circular section of the ring 15, 16 to ensure that the ring 15, 16 does not accidentally leave the position thereof inside the perimeter channel 6.

Figure 5:
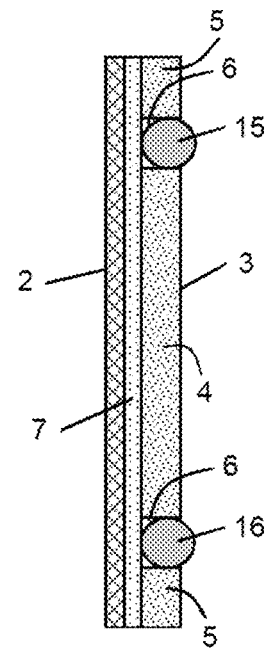
FIG. 5 is a sectional view of the shade of FIG. 1, particularly according to the B-B cut of FIG. 2, also showing the position of the rings of the support structure present in FIG. 1 as part of the assembly.

Represented in FIG. 5, it is shown as a preferred variant for the shade 1 that each perimeter channel 6 constitutes a separation between the main portion 4 and the secondary portions 5 of corrugated surface since the depth of the perimeter channel 6 is such that the bottom thereof is formed by the intermediate layer 7. Whereas, according to another shade variant 1, specifically that shown in FIG. 12, the exterior face 3 is formed by a single corrugated surface portion according to the vertical direction and by two perimeter channels 6, formed by respective notches or depressions made by milling or carving on the corrugated surface. Thus, in the variant of FIG. 12, the perimeter channels 6 do not divide the interior face 3 completely in more than one corrugated surface portion.

The configuration of the enveloping body of the shade 1 depends on the form which the laminar structure has, formed by the joining of the three layers before being closed on themselves and also in the form of the support structure 10. As has been mentioned, the enveloping body preferably has a cylindrical form (see FIG. 1), the result of having closed a laminar structure in the form of a rectangle (see FIGS. 2 and 3) on itself and of having coupled respective rings 15 and 16 with circular perimeter in the perimeter channels 6.

Figure 8:
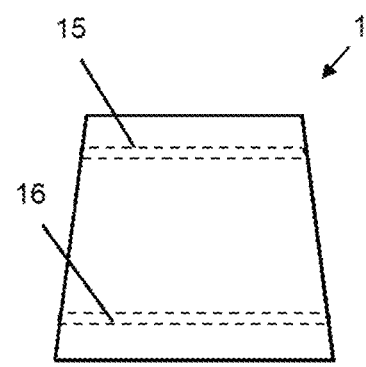
FIG. 8 is an elevation view, seen from the exterior, of the truncated conic enveloping body formed from the structure of FIG. 7.

According to other variants, the enveloping body of the shade 1 can adopt other forms, such as for example a truncated cone with open upper and lower ends, as is observed in FIG. 8, when a laminar structure is folded on itself as that shown in FIG. 7, joining the two lateral edges 18 and 19. By way of example, the truncated conic shade 1 of FIG. 8 has a diameter less than 50 cm, a diameter greater than 36 cm and a total height of 46 cm. When it is a truncated conic shade 1, it is observed that the upper ring 15 has a smaller diameter than the lower ring 16, both represented in broken dashed lines as they are in the hollow which configures the enveloping body. Due to the fact that the coning angle is not open very much, it has been checked that the corrugations of the interior face 3 can be arranged vertically like in the cylindrical shades 1 and which, in the positioning of the support structure 1 to the truncated conic shade 1, the rings 15 and 16 are displaced without difficulty on the corrugated surface, being guided by the direction of the corrugations until the perimeter channels 6 being inserted.

Another exemplary shade variant 1 is shown in FIG. 11 in which the enveloping body has a rectangular prism form with open upper and lower ends and rounded edges and in which the rings 15 and 16 with rectangular contour and rounded edges represented in FIG. 10 are coupled. According to another variant, the rings 15 and 16 can have an oval form.

In FIG. 13 the flattened profile of another variant of the enveloping body which, unlike that previously described, is not formed by the joining of layers, but is formed by a molded laminar structure (which is then closed on itself to configure the enveloping body). This molded structure has an interior face 3 which comprises at least one corrugated surface portion, configured by a succession of peaks and troughs and at least one perimeter channel 6, the exterior face 2 being smooth and the space between the interior face 3 and the exterior face 2 being full of material. The peaks and troughs as well as the channels 6 are the result of the form of the mold used to obtain the laminar structure which will be closed on itself forming the enveloping body. In this case, the enveloping body is preferably made of cardboard, paperboard, silicon or plastic.

Figure 14:
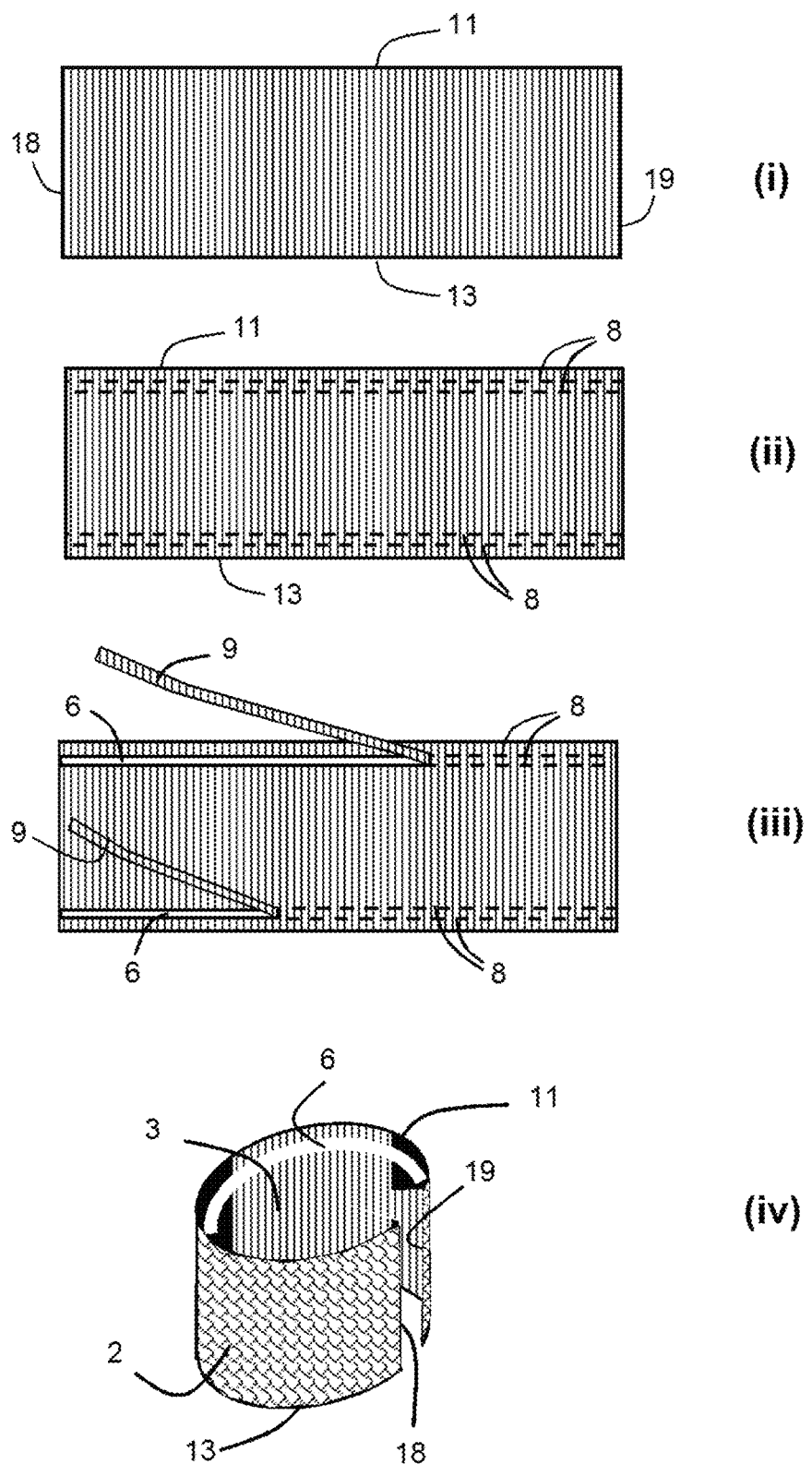
FIG. 14 is a simplified diagram of some of the steps of the method for manufacturing a shade like that in FIG. 1, object of the invention.

Below the method for manufacturing a lamp shade 1 such as that in FIG. 1 is explained by way of the steps (i) to (iv) of FIG. 14.

Step (i) proceeds from a rectangular portion formed by the joining of three layers, specifically a first configuration layer and materials such as those described for the layer of the exterior face 2, an intermediate configuration layer and materials such as those described for the intermediate layer 7 and a third layer which has a corrugated surface structure according to a first direction which will be termed the vertical direction, the corrugations and materials thereof are such as those described for the interior face 3.

In step (ii), two upper cuts 8 parallel side by side are made in the horizontal direction, that is to say, perpendicular to the direction of the corrugations, which pass through the thickness of the third layer but without cutting the intermediate layer 7. Afterwards or simultaneously, the two lower cuts 8 are made in the same manner.

Below, in step (iii) the part of the corrugated structure limited by the two upper cuts 8 and the part of the corrugated structure limited by the two lower cuts 8 is removed, therefore leaving the respective parts of the intermediate layer 7 uncovered and respective perimeter channels 6 being formed. Upon finalizing step (iii), it can be confirmed that the interior face 3 has been configured as such since it is divided into a main portion 4 and two secondary portions 5 and comprises the two perimeter channels 6.

Below, the rectangular portion is proceeded to be folded in the indicated form in step (iv) opposing and joining (can be by overlapping) the two lateral edges 18 and 19 to form a hollow cylindrical enveloping body.

Lastly, to assemble the lamp, one of the two rings 15 or 16 is taken (represented in FIG. 1), for example the lamp holder ring 15 and is introduced vertically or slightly inclined into the interior of the hollow of the cylinder and is then displaced and is inclined until the contour of the ring 15 fits into the upper perimeter channel 6. Then the same happens with the second ring 16 of the support structure 10. The positioning of the rings 15 and 16 is simple and fast since the displacement of the rings 15 and 16 to the corresponding perimeter channel 6 thereof is favored by the corrugations of the interior layer 3 which serve as a guide for fitting into the perimeter channels 6.

In this way, thanks to the corrugated surface of the interior face 3 and to the arrangement of the perimeter channels 6 in the same, on the one hand, the shade 1 occupies a relatively smaller space for the storage and transport thereof and the lamp can be sent without being assembled and, on the other hand, a fast and simple assembly of the lamp is achieved which only occupies a considerable volume in the operative position, when the support structure 10 is coupled to the shade 1. The disassembly of the lamp, that is to say, the decoupling of the rings 15 and 16 from the perimeter channels 6 is carried out, lightly pushing the projecting part of the rings 15, 16 until they leave the perimeter channels 6 or horizontally folding the exterior face 2 on the areas matching the position of the channels 6 so that the bottoms of the perimeter channels 6, when pressed towards the interior of the enveloping body, displace a part of the rings 15, 16.

It should be mentioned that when the cuts 8 are carried out in step (ii), the corrugated surface structure has to be necessarily joined to the intermediate layer 7, however, the exterior layer can be joined to the intermediate layer 7 by the other face thereof after the fact, once the portions remaining to form the perimeter channels 6 in step (iii) have been removed.

Another advantage of the shade 1 described is that the interior face 3, abundantly provided with corrugations, evens the surface of the shade 1 when the light source is turned on, that is to say, areas clearer than others are not seen due to the effect of the light because the only areas devoid of corrugations are the areas in which the perimeter channels 6 are formed and these, in the operative position, are occupied by the rings 15 and 16 and therefore, they do not create an area that is clearer than another.

Alternatively to the steps (i)-(iv) described, it should be mentioned that the channels 6 can also be made by milling or carving the corrugated surface of the interior face 3 instead of making the pairs of cuts 8 and removing the cut part. With one milling, a channel 6 can be created in the manner of a notch with certain height, reducing the peaks of a part of the corrugated surface to accommodate the rings 15 and 16.

The invention claimed is:

1. A lamp shade formed by a hollow enveloping body with laminar structure closed on itself, which in a non-operative position is configured to be folded for storage, and which in an operative position is assembled on a support structure and extends laterally around a light source, an upper edge of the enveloping body configuring an upper opening and a lower edge of the enveloping body configuring a lower opening, in which the enveloping body comprises an exterior face and an interior face intended to be orientated towards the light source in the operative position, the interior face being rigid in the vertical direction relative to the horizontal direction and flexible in the horizontal direction relative to the vertical direction, the vertical direction being determined as that which goes from the upper opening to the lower opening, wherein the exterior face and the interior face belong to two different layers of those which the enveloping body is formed, and wherein the interior face comprises at least two corrugated surface portions extending in the vertical direction, namely a main portion and a secondary portion, each corrugated surface portion being formed by a sheet with multiple folds in the vertical direction forming a succession of peaks and troughs, and at least one perimeter channel separating the main portion and the secondary portion that extends in the perpendicular direction or with a certain inclination with respect to the corrugations for coupling the support structure to the shade, wherein the secondary portion is arranged between the perimeter channel and the upper edge or between the perimeter channel and the lower edge of the enveloping body and wherein the height of the secondary portion measured in the vertical direction is smaller than the height of the main portion.

2. The shade according to claim 1, wherein the interior face comprises another secondary portion such that the interior face comprises three corrugated surface portions, formed by the main portion and by the two secondary portions, one upper and one lower, the upper secondary portion being arranged between the upper edge and a perimeter channel which separates the upper secondary portion from the main portion and the lower secondary portion between the lower edge and another perimeter channel which separates the lower secondary portion from the main portion.

3. A shade and support structure assembly, comprising a shade according to claim 2, wherein the support structure comprises a lamp holder ring, the dimensions thereof are adapted for being housed with adjustment in one perimeter channel of the shade, and a second ring, the dimensions thereof are adapted for being housed with adjustment in the other perimeter channel of the interior face of the shade.

4. A method for manufacturing a lamp shade defined in claim 2, wherein the method comprises the steps of:
   a) having a structure which comprises, on one of the faces thereof, three corrugated surface portions and two channels which extend in a perpendicular direction or with a certain inclination with respect to the corrugations, the structure being delimited by an upper edge and a lower edge, perpendicular to a direction in which the corrugations are arranged, and two lateral edges, the cited face being rigid in the direction of the corrugations relative to the direction perpendicular to the corrugations, wherein three corrugated surface portions are formed by a main portion and by two secondary portions, upper and lower, such that the upper secondary portion is arranged between the upper edge and a perimeter channel which separates the upper secondary portion from the main portion and the lower secondary portion is arranged between the lower edge and another channel which separates the lower secondary portion from the main portion, wherein each corrugated surface is formed by a sheet with multiple folds in the vertical direction forming a succession of peaks and troughs; and
   b) joining the two lateral edges, opposing them or superimposing them, configuring a hollow enveloping body in which the upper edge of the enveloping body forms the upper opening of the shade and the lower edge forms the lower opening of the shade, wherein the exterior face and the interior face belong to two different layers of the enveloping body is formed.

5. The method according to claim 4 for manufacturing a lamp shade, wherein the structure of step a) is the result of joining an exterior layer of laminar structure to an interior layer by way of the corresponding joining by adhesive of said layers to an intermediate layer of laminar structure, wherein the interior layer is that which, on the free face thereof, comprises the portions of corrugated surface and the two channels.

6. The method according to claim 5, wherein each channel has been made by forming, in the interior layer, two parallel cuts from one of the lateral edges to the other lateral edge following a perpendicular direction or with a certain inclination with respect to the corrugations, the cuts being separated from each other by a certain distance and the depth of the cuts being equal to a thickness of the interior layer, passing through the interior layer completely and subsequently the part of interior layer between the two cuts is removed, separating the part of the interior layer from a corresponding part of intermediate layer to which the part of the interior layer was joined, the rest of the interior layer remaining joined to the intermediate layer.

7. The method according to claim 5, wherein each channel has been made by milling or carving a part of the corrugated surface of the interior layer from one of the lateral edges to the other lateral edge following a perpendicular direction or with a certain inclination with respect to the corrugations, the depth of the milling or carving being equal to or less than the thickness of the interior layer, passing through the interior layer completely or partially.

8. The method according to claim 5, wherein the exterior layer is joined to the intermediate layer before or after making the channels in the interior layer already joined to the intermediate layer.

9. The shade according to claim 1, wherein the at least one perimeter channel is formed by a notch or depression so as to interrupt continuity in the corrugated surfaces between the main portion and the secondary portion.

10. The shade according to claim 1, wherein the succession of peaks and troughs of the respective corrugated surface has a profile, the transversal section thereof, according to a cut perpendicular to the vertical direction, is in the form of a zigzag, undulated or with trapezoidal, rectangular or square waves.

11. The shade according to claim 10, wherein the thickness of the wall of the profile, measured in the direction perpendicular to the vertical direction is between 0.02 mm and 0.5 mm and wherein the corrugated surface has a thickness of between 1.5 and 50 mm.

12. The shade according to claim 10, wherein the profiles are in the form of a zigzag, undulated or with trapezoidal, rectangular or square waves with rounded edges.

13. The shade according to claim 1, wherein the corrugated surface is made of a plastic or plasticized material.

14. The shade according to claim 1, wherein the at least one perimeter channel has a height, measured in the vertical direction of between 1 and 50 mm.

15. The shade according to claim 1, wherein the exterior face and the interior face belong to two different layers of those which the enveloping body is formed, joined together by means of an intermediate layer with a laminar structure provided with an adhesive on two faces thereof.

16. The shade according to claim 15, wherein the layer of the exterior face is a laminar structure made of synthetic material or material of animal or plant origin.

17. The shade according to claim 1, wherein the enveloping body has a cylindrical form or truncated conic form.

* * * * *